(12) United States Patent
Chen

(10) Patent No.: US 12,373,151 B2
(45) Date of Patent: Jul. 29, 2025

(54) DISPLAY DEVICE, DISPLAY SYSTEM, AND DISPLAY AND CONTROL METHOD

(71) Applicant: Wistron Corporation, New Taipei (TW)

(72) Inventor: Feng Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/522,279

(22) Filed: Nov. 29, 2023

(65) Prior Publication Data

US 2025/0130751 A1   Apr. 24, 2025

(30) Foreign Application Priority Data

Oct. 20, 2023   (TW) ................................ 112140219

(51) Int. Cl.
*G06F 3/14* (2006.01)
*G06F 3/0354* (2013.01)
*H04L 9/08* (2006.01)

(52) U.S. Cl.
CPC .......... *G06F 3/1423* (2013.01); *G06F 3/0354* (2013.01); *H04L 9/0822* (2013.01)

(58) Field of Classification Search
CPC ..... G06F 3/1423; G06F 3/0354; H04L 9/0822
See application file for complete search history.

(56) References Cited

U.S. PATENT DOCUMENTS

| | | | |
|---|---|---|---|
| 8,156,267 B2 | 4/2012 | Chen et al. | |
| 11,029,751 B2 | 6/2021 | Sung et al. | |
| 2010/0064076 A1 | 3/2010 | Chen et al. | |
| 2017/0142469 A1* | 5/2017 | Cho ................. | H04N 21/23113 |
| 2017/0235461 A1* | 8/2017 | Oh .......................... | G06F 3/167 |
| | | | 715/716 |
| 2019/0377422 A1 | 12/2019 | Sung et al. | |
| 2020/0026479 A1 | 1/2020 | Chen | |
| 2020/0293930 A1* | 9/2020 | Chen ....................... | G06N 5/04 |
| 2022/0391158 A1* | 12/2022 | Lemmens ............. | G06F 3/1438 |
| 2024/0053879 A1* | 2/2024 | Wang ...................... | G09G 5/14 |
| 2024/0168574 A1* | 5/2024 | Zeung ................. | G06F 3/03547 |

FOREIGN PATENT DOCUMENTS

| | | |
|---|---|---|
| CN | 110597474 | 12/2019 |
| CN | 115696641 | 2/2023 |
| TW | 201011634 | 3/2010 |

(Continued)

*Primary Examiner* — Xuemei Zheng
(74) *Attorney, Agent, or Firm* — JCIPRNET

(57) ABSTRACT

A display device, a display system, and a display and control method are provided. The display device includes a display module, a first multimedia interface, a second multimedia interface, and a controller. The controller receives first picture data of a first picture of a first electronic device via the first multimedia interface, and receives second picture data of a second picture of a second electronic device via the second multimedia interface. The controller determines a content of a display picture displayed by the display module according to the first picture data and the second picture data, and the controller determines whether an input device is used to control the first electronic device or the second electronic device according to a mouse position in the display picture.

17 Claims, 9 Drawing Sheets

(56) References Cited

FOREIGN PATENT DOCUMENTS

| TW | M575142 | 3/2019 | | |
|---|---|---|---|---|
| TW | 202001579 | 1/2020 | | |
| TW | 202007177 | 2/2020 | | |
| TW | M593583 | 4/2020 | | |
| TW | M593583 U | * | 4/2020 | ............... G06F 3/10 |
| WO | WO 2023/039294 A2 | * | 3/2023 | ............. G06F 3/165 |

* cited by examiner

DISPLAY DEVICE, DISPLAY SYSTEM, AND DISPLAY AND CONTROL METHOD

CROSS-REFERENCE TO RELATED APPLICATION

This application claims the priority benefit of Taiwan application serial no. 112140219, filed on Oct. 20, 2023. The entirety of the above-mentioned patent application is hereby incorporated by reference herein and made a part of this specification.

BACKGROUND OF THE INVENTION

Field of the Invention

The invention relates to a device, and in particular, to a display device, a display system, and a display and control method.

Description of Related Art

The traditional way of sharing an input device with a plurality of electronic devices is to connect a switching input device to one of the electronic devices via an external KVM (keyboard, video, mouse) switch. However, the traditional sharing method requires switching the USB upstream port, so that the electronic device needs to re-detect the input device during each switching process, resulting in significant switching delay and thus affecting user experience. Moreover, although the prior art may implement switching of the input device via a software KVM (keyboard, video, mouse) switch to reduce switching delay, there is a situation of poor data security.

SUMMARY OF THE INVENTION

The invention provides a display device, a display system, and a display and control method that enable a plurality of electronic devices to share an input device and a display picture.

A display device of an embodiment of the invention includes a display module, a first multimedia interface, a second multimedia interface, and a controller. The first multimedia interface is coupled to a first electronic device. The second multimedia interface is coupled to a second electronic device. The controller is coupled to the display module, the first multimedia interface, and the second multimedia interface. The controller receives first picture data of a first picture of the first electronic device via the first multimedia interface, and receives second picture data of a second picture of the second electronic device via the second multimedia interface. The controller determines a content of a display picture displayed by the display module according to the first picture data and the second picture data, and the controller determines whether an input device is used to control the first electronic device or the second electronic device according to a mouse position in the display picture.

A display and control method of an embodiment of the invention includes the following steps: receiving first picture data of a first picture of a first electronic device via a first multimedia interface and receiving second picture data of a second picture of a second electronic device via a second multimedia interface by a controller of a display device; determining a content of a display picture via a display module according to the first picture data and the second picture data by the controller; and determining whether an input device is used to control the first electronic device or the second electronic device according to a mouse position in the display picture by the controller.

A display system of an embodiment of the invention includes a first electronic device, a second electronic device, and a display device. The display device is coupled to the first electronic device and the second electronic device. The display device receives first picture data of a first picture of the first electronic device, and the display device receives second picture data of a second picture of the second electronic device. The display device determines a content of a display picture according to the first picture data and the second picture data. The display device determines whether an input device is used to control the first electronic device or the second electronic device according to a mouse position in the display picture.

Based on the above, the display device, the display system, and the display and control method of the invention may display the picture data provided by the first electronic device and the second electronic device simultaneously via the display device, and determine whether the input device is used to control the first electronic device or the second electronic device according to the mouse position in the display picture.

In order to make the aforementioned features and advantages of the disclosure more comprehensible, embodiments accompanied with figures are described in detail below.

DESCRIPTION OF THE EMBODIMENTS

Figure 1:
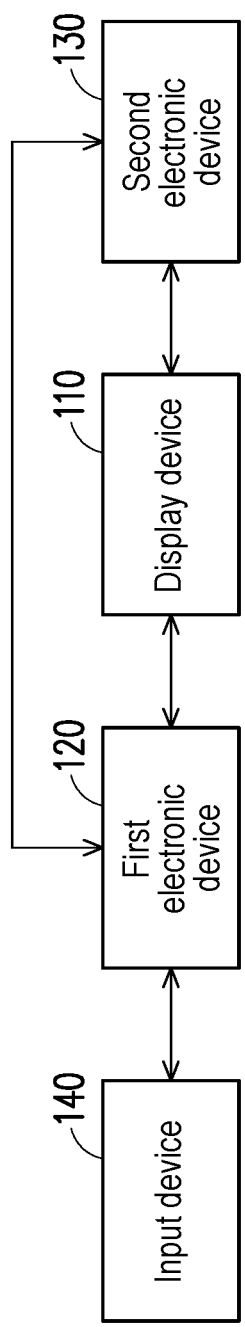
FIG. 1 is a schematic diagram of a display system according to an embodiment of the invention.

A portion of the embodiments of the invention is described in detail hereinafter with reference to figures. In the following, the same reference numerals in different figures should be considered to represent the same or similar elements. The embodiments are only a part of the invention, and do not disclose all possible implementation modes of the invention. Rather, the embodiments are merely examples of devices and methods within the scope of the invention.

FIG. 1 is a schematic diagram of a display system according to an embodiment of the invention. Referring to FIG. 1, a display system 100 includes a display device 110, a first electronic device 120, a second electronic device 130, and an input device 140. The display device 110 is coupled to the first electronic device 120 and the second electronic device 130. In an embodiment, the first electronic device 120 may be a master device, and the second electronic device 130 may be a slave device, but the invention is not limited thereto. The first electronic device 120 and the second electronic device 130 may respectively be a computer device having a display function, such as a desktop computer, a notebook computer, or a tablet computer, but the invention is not limited thereto. In an embodiment, at least one of the first electronic device 120 and the second electronic device 130 may also be a computer device without a display function. In addition, the number of at least one of the first electronic device 120 and the second electronic device 130 may be a plurality, and is not limited to what is shown in the figures.

In an embodiment, the display device 110 may be connected to the first electronic device 120 and the second electronic device 130 via two multimedia interfaces supporting Display Data Channel Command Interface (DDCCI) and two physical signal lines. The display device 110 may receive first picture data of a first picture of the first electronic device 120 via a multimedia interface, and the display device 110 may receive second picture data of a second picture of the second electronic device 130 via another multimedia interface. The display device 110 may determine a content of a display picture according to the first picture data and the second picture data.

In an embodiment, the display device 110 may be used to implement an external picture function to display picture data provided by at least one of the first electronic device 120 and the second electronic device 130. In an embodiment, the first electronic device 120 is also coupled to the input device 140, and the input device 140 may be connected to the first electronic device 120 via a wired or wireless connection. The input device 140 may include, for example, a mouse and/or a keyboard, but the invention is not limited thereto. In an embodiment, the display device 100 may determine whether the input device 140 is used to control the first electronic device 120 or the second electronic device 130 according to a mouse position in the display picture. In an embodiment, the first electronic device 120 and the second electronic device 130 may also include a wireless communication interface respectively, and establish a connection so that the second electronic device 130 may obtain input control data of the input device 140 via the first electronic device 120. The input control data includes, for example, displacement data, a control command, or other data. In an embodiment, the first electronic device 120 and the second electronic device 130 may be connected wirelessly via Ethernet or WiFi, for example, but the invention is not limited thereto.

For example, in response to the mouse position being located within the picture provided by the first electronic device 120, the display device 110 may notify the first electronic device 120, and the first electronic device 120 controls the mouse to move within the picture provided by the first electronic device 120 according to the input control data of the input device 140. In contrast, in response to the mouse position being located within the picture provided by the second electronic device 130, the display device 110 may notify the second electronic device 130, and the second electronic device 130 obtains the displacement data and the control command of the input device 140 via the first electronic device 120 to control the mouse to move within the picture provided by the second electronic device 130 according to the displacement data and the control command of the input device 140. In this way, the first electronic device 120 and the second electronic device 130 may share the display device 110 to display a picture, and may share the input device 140 to perform a picture operation or a related computer operation, for example.

Figure 2:
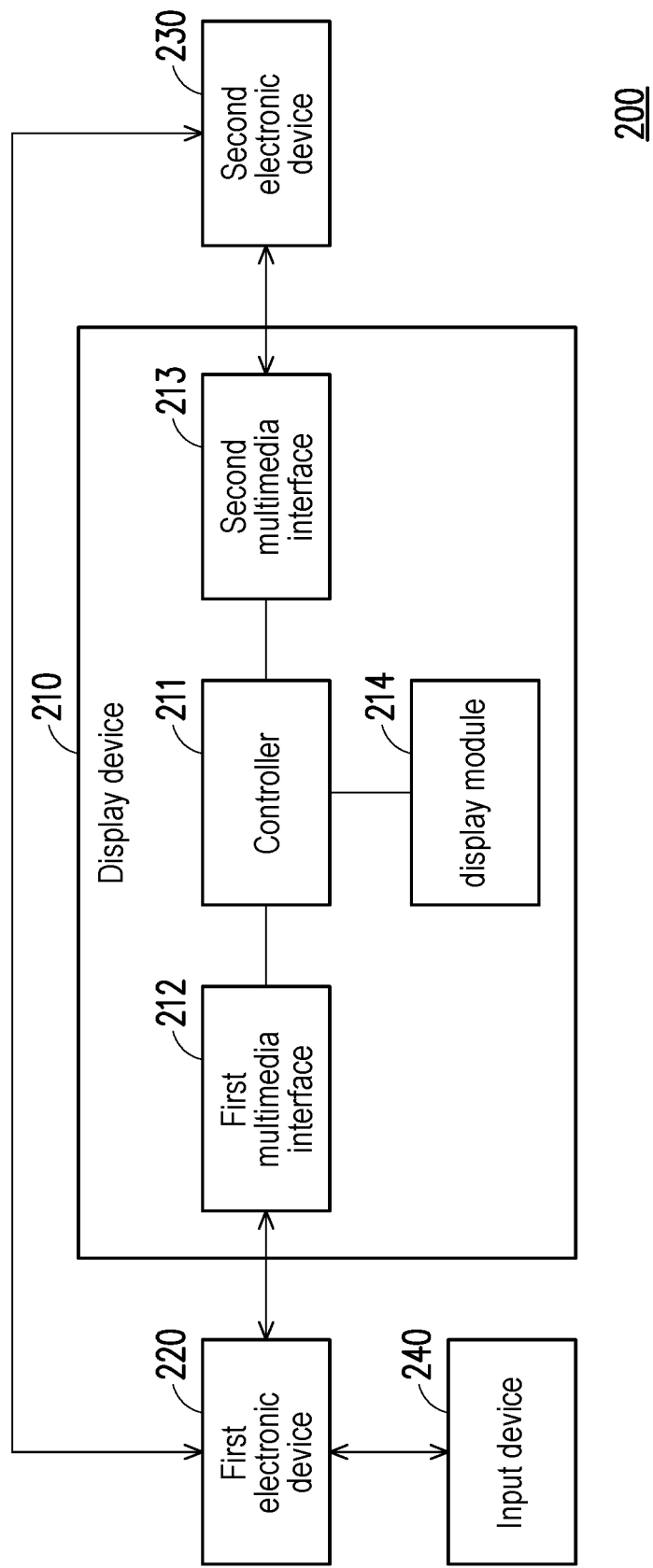
FIG. 2 is a schematic diagram of a display system according to an embodiment of the invention.

FIG. 2 is a schematic diagram of a display system according to an embodiment of the invention. Referring to FIG. 2, a display system 200 includes a display device 210, a first electronic device 220, a second electronic device 230, and an input device 240. In an embodiment, the display device 210 includes a controller 211, a first multimedia interface 212, a second multimedia interface 213, and a display module 214. The controller 211 is coupled to the first multimedia interface 212, the second multimedia interface 213, and the display module 214. The display device 210 may be coupled to the first electronic device 220 via the first multimedia interface 212 and coupled to the second electronic device 230 via the second multimedia interface 213. The first electronic device 220 may also be coupled to the input device 240.

In an embodiment, the controller 211 may include, for example, a scaling controller (scaler) and/or other display driver chips. The controller 211 may be coupled to the display module 214 via an embedded display port (eDP), for example. The display module 214 may include a display panel. The first multimedia interface 212 and the second multimedia interface 213 may respectively be, for example, a High Definition Multimedia Interface (HDMI) supporting DDCCI, but the invention is not limited thereto. The first electronic device 220 and the second electronic device 230 may also include a wireless communication interface respectively, and establish wireless communication connection, so that the first electronic device 220 may be wirelessly communicated with the second electronic device 230, and the second electronic device 230 may obtain the displacement data and the control command of the input device 240 via the first electronic device 220. Other data may also be transmitted between the first electronic device 220 and the second electronic device 230 via a wireless communication method.

Figure 3:
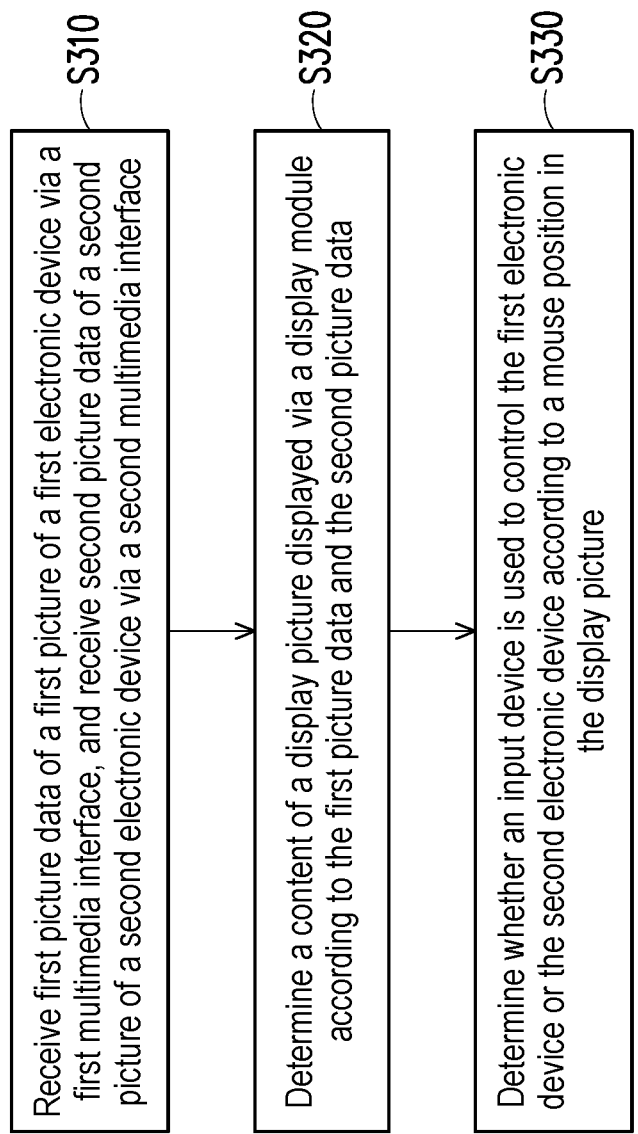
FIG. 3 is a flowchart of a display and control method according to an embodiment of the invention.

FIG. 3 is a flowchart of a display and control method according to an embodiment of the invention. Referring to FIG. 1 and FIG. 2, the display system 200 may perform the following steps S310 to S330. In step S310, the controller 211 of the display device 210 may receive first picture data of a first picture of the first electronic device 220 via the first multimedia interface 212 and receive second picture data of a second picture of the second electronic device 230 via the second multimedia interface 213. In an embodiment, the first picture may be a first extended picture that the first electronic device 220 is to display, and the second picture may be a second extended picture that the second electronic device 230 is to display. However, the invention is not limited thereto. In an embodiment, the first picture may also be a first mirror picture or a first projection picture that the first electronic device 220 is to display. The second picture may also be a second mirror picture or a second projection picture that the second electronic device 230 is to display.

In step S320, the controller 211 may determine the content of the display picture via the display module 214 according to the first picture data and the second picture data. In an embodiment, the controller 211 may be operated in a single picture mode, a dual picture mode, a picture-in-picture mode, etc. according to settings. The first picture data and the second picture data may, for example, include picture position data and picture size data respectively.

In step S330, the controller 211 may determine whether the input device 240 is used to control the first electronic device 220 or the second electronic device 230 according to a mouse position in the display picture. Accordingly, in response to the controller 211 determining the input device 240 is used to control the first electronic device 220 according to the mouse position in the display picture, the first electronic device 220 may directly use the input control data provided by the input device 240. In contrast, in response to the controller 211 determining the input device 240 is used to control the second electronic device 230 according to the mouse position in the display picture, the input control data of the input device 240 from the first electronic device 220 is obtained via a wireless communication method by the second electronic device 230. Therefore, the display device 210 of the present embodiment may simultaneously display picture data provided by the first electronic device 220 and the second electronic device 230, and may allow the first electronic device 220 and the second electronic device 230 to share the input device 240.

Figure 4:
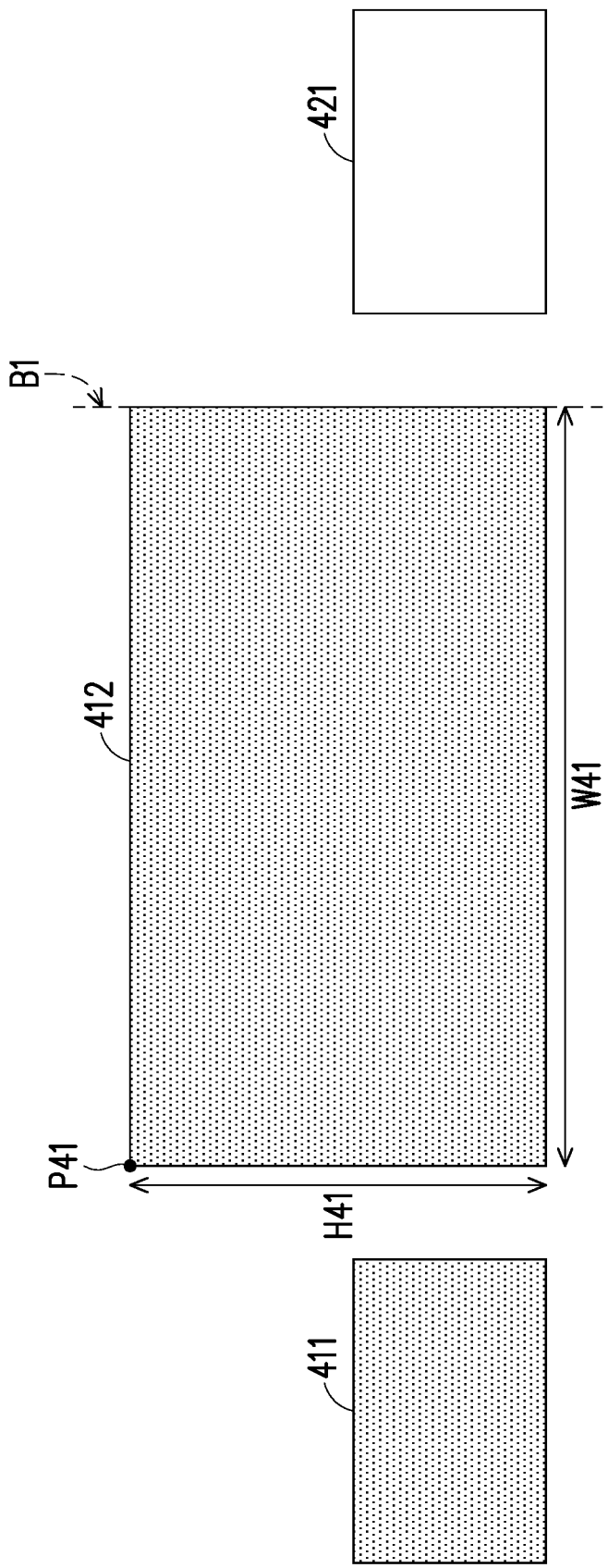
FIG. 4 is a schematic diagram of a single picture mode according to an embodiment of the invention.

FIG. 4 is a schematic diagram of a single picture mode according to an embodiment of the invention. Referring to FIG. 2 and FIG. 4, in response to the controller 211 operating the single picture mode, the display of the first electronic device 220 may display a first main picture 411, and the first electronic device 220 may provide the first picture data to the display device 210 so that the display module 214 of the display device 210 may display a first extended picture 412. In an embodiment, the first picture data may include, for example, first picture position data and first picture size data. The first picture position data may, for example, include the coordinates of a picture starting position P41 of the first extended picture 412. The first picture size data may, for example, include the picture resolution information of the first extended picture 412, that is, including a number of vertical pixels (vertical resolution) H41 and a number of horizontal pixels (horizontal resolution) W41.

In an embodiment, the display of the second electronic device 230 may display a second main picture 421. The second electronic device 230 may also provide second display data to the display device 210, and the second picture data may also include, for example, second picture position data and second picture size data. Accordingly, since the controller 211 is operated in the single picture mode and displays the first extended picture 412 of the first electronic device 220, the second picture position data may be, for example, the end position of the picture (for example, the picture coordinates of the last point in the picture displayed by the display module 214). In an embodiment, the controller 211 may also separately display the second extended picture of the second electronic device 230 according to the second picture data of the second electronic device 230 via the display module 214.

In an embodiment, in response to the user operating the input device 240 (such as a mouse) to bring the mouse close to a picture edge B1, the controller 211 may determine whether the mouse position is located at the picture edge B1 and continues to move in a direction beyond the picture edge B1 to determine that the user is to control the second electronic device 230. Therefore, the controller 211 may notify the first electronic device 220 and the second electronic device 230 and transfer the control right of the input device 240 from the first electronic device 220 to the second electronic device 230. The mouse is moved from the first extended picture 412 to the second main picture 421.

In this way, while the mouse is located in the second main picture 421, the second electronic device 230 may obtain the input control data of the input device 240 from the first electronic device 220 via a wireless communication method. Moreover, even if the second picture size data is not 0, since the display of the second electronic device 230 displays the second main picture 421 and the display module 214 of the display device 210 only displays the first extended picture 412, and the second extended picture is not displayed (or is displayed by another display device), the mouse is displayed in the second main picture 421 after exceeding the picture edge B1 from the first extended picture 412.

In addition, in an embodiment, the controller 211 may also define a predetermined range at a side of the picture edge B1. In response to the controller 211 determining that the mouse position is within the predetermined range (for example, the distance between the mouse and the picture edge B1 is less than a preset distance) and continues to move toward the picture edge B1, the controller 211 may notify the first electronic device 220 and the second electronic device 230 in advance to prepare to switch the control right, so that when the controller 211 determines that the mouse position touches the picture edge B1, the controller 211 may quickly switch the control right from the first electronic device 220 to the second electronic device 230. Therefore, the user's sense of delay when operating the mouse to move from the first extended picture 412 to the second main picture 421 may be effectively reduced.

Figure 5:
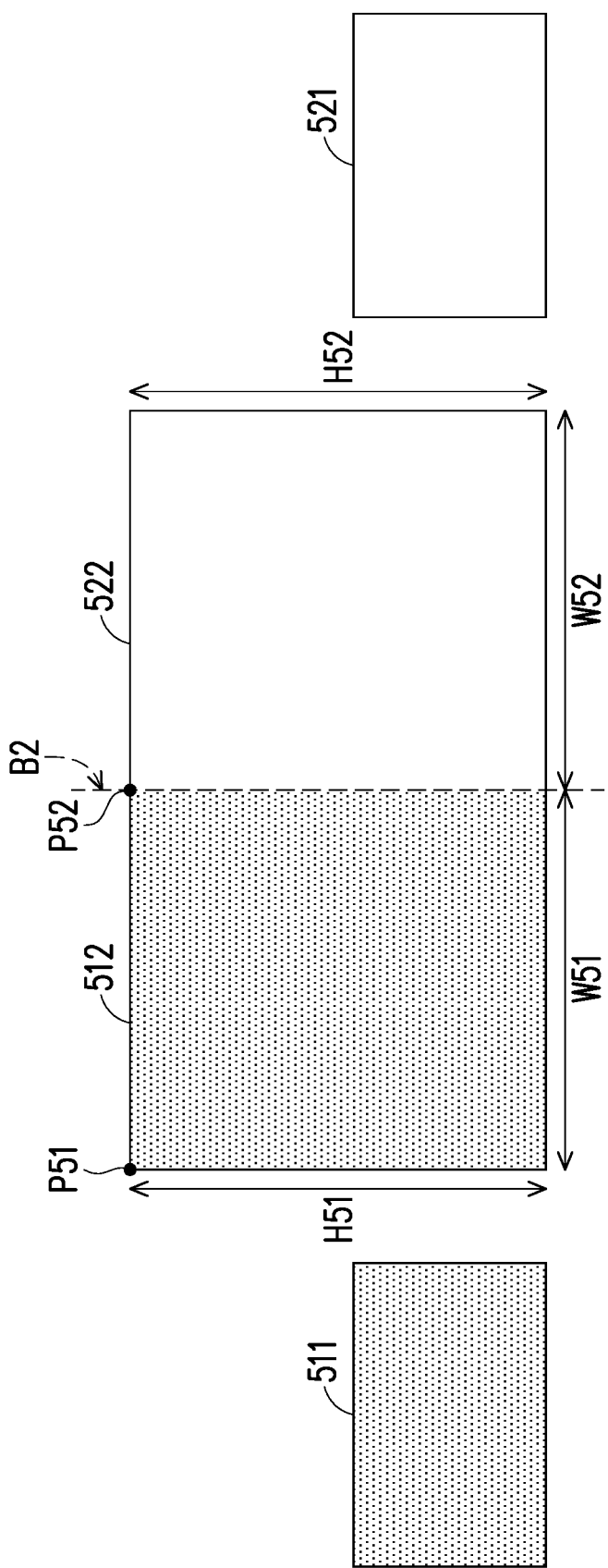
FIG. 5 is a schematic diagram of a dual picture mode according to an embodiment of the invention.

FIG. 5 is a schematic diagram of a dual picture mode according to an embodiment of the invention. Referring to FIG. 2 and FIG. 5, in response to the controller 211 operating the dual picture mode, the display picture displayed by the display module 214 includes a first extended picture 512 and a second extended picture 522. The display of the first electronic device 220 may display a first main picture 511, and the first electronic device 220 may provide the first picture data to the display device 210 so that the display module 214 of the display device 210 may display the first extended picture 512. In an embodiment, the first picture data may include, for example, first picture position data and first picture size data. The first picture position data may, for example, include the coordinates of a picture starting position P51 of the first extended picture 512. The first picture size data may, for example, include the picture resolution information of the first extended picture 512, that is, including a number of vertical pixels H51 and a number of horizontal pixels W51.

In an embodiment, the display of the second electronic device 230 may display a second main picture 521, and the second electronic device 230 may provide the second picture data to the display device 210 so that the display module 214 of the display device 210 may display the second extended picture 522. In an embodiment, the second picture data may include, for example, second picture position data and second picture size data. The second picture position data may, for example, include the coordinates of a picture starting position P52 of the second extended picture 522. The second picture size data may, for example, include the picture resolution information of the second extended picture 522, that is, including a number of vertical pixels H52 and a number of horizontal pixels W52.

In an embodiment, the display module 214 may display the first extended picture 512 and the second extended picture 522 at the same time to present a dual picture. Moreover, in response to the user operating the input device 240 (such as a mouse) to move from the first extended picture 512 to the second extended picture 522 so that the mouse is brought close to a picture edge B2, the controller 211 may determine whether the mouse position is located at the picture edge B2 and continues to move toward the second extended picture 522 to determine that the user is to control the second electronic device 230. Therefore, the controller 211 may notify the first electronic device 220 and the second electronic device 230 and transfer the control right of the input device 240 from the first electronic device 220 to the second electronic device 230. The mouse is moved from the first extended picture 512 to the second extended picture 522. In this way, while the mouse is located in the second extended picture 522 or the second main picture 521, the second electronic device 230 may obtain the input control data of the input device 240 from the first electronic device 220 via a wireless communication method.

In contrast, in response to the user operating the input device 240 (such as a mouse) to move from the second extended picture 522 to the first extended picture 512 so that the mouse is brought close to the picture edge B2, the controller 211 may determine whether the mouse position is located at the picture edge B2 and continues to move toward the first extended picture 512 to determine that the user is to control the first electronic device 220. Therefore, the controller 211 may notify the first electronic device 220 and the second electronic device 230 and transfer the control right of the input device 240 from the second electronic device 230 to the first electronic device 220. The mouse is moved from the second extended picture 522 to the first extended picture 512. In this way, when the mouse is located in the first extended picture 512 or the first main picture 511, the first electronic device 220 may directly use the input control data of the input device 240.

In addition, in an embodiment, the controller 211 may also define a first predetermined range and a second predetermined range at two sides of the picture edge B2. In response to the controller 211 determining that the mouse position is within the first predetermined range or the second predetermined range (for example, the distance between the mouse and the left side or the right side of the picture edge B2 is less than the preset distance) and continues to move toward the picture edge B2, the controller 211 may notify the first electronic device 220 and the second electronic device 230 in advance to prepare to switch the control right, so that when the controller 211 determines that the mouse position touches the picture edge B2, the controller 211 may quickly switch the control right from the first electronic device 220 to the second electronic device 230, or may quickly switch the control right from the second electronic device 230 to the first electronic device 220. Therefore, the user's sense of delay when operating the mouse to move between the first extended picture 512 and the second extended picture 522 may be effectively reduced.

Figure 6:
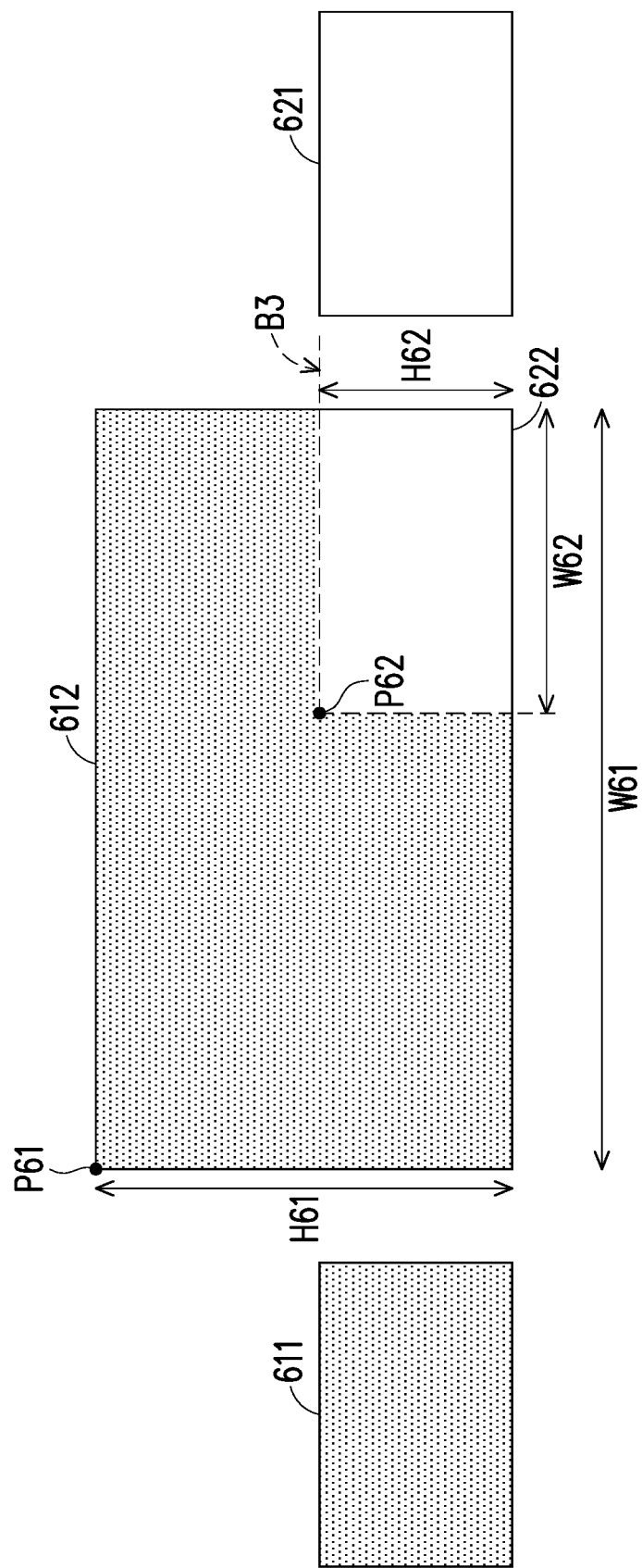
FIG. 6 is a schematic diagram of a letter picture mode according to an embodiment of the invention.

FIG. 6 is a schematic diagram of a letter picture mode according to an embodiment of the invention. Referring to FIG. 2 and FIG. 6, in response to the controller 211 operating the picture-in-picture mode, the display picture displayed by the display module 214 includes a first extended picture 612 and a second extended picture 622. The second extended picture 622 is overlapped with a portion of the first extended picture 612. The display of the first electronic device 220 may display a first main picture 611, and the first electronic device 220 may provide the first picture data to the display device 210 so that the display module 214 of the display device 210 may display the first extended picture 612. In an embodiment, the first picture data may include, for example, first picture position data and first picture size data. The first picture position data may, for example, include the coordinates of a picture starting position P61 of the first extended picture 612. The first picture size data may, for example, include the picture resolution information of the first extended picture 612, that is, including a number of vertical pixels H61 and a number of horizontal pixels W61.

In an embodiment, the display of the second electronic device 230 may display a second main picture 621, and the second electronic device 230 may provide the second picture data to the display device 210 so that the display module 214 of the display device 210 may display the second extended picture 622. In an embodiment, the second picture data may include, for example, second picture position data and second picture size data. The second picture position data may, for example, include the coordinates of a picture starting position P62 of the second extended picture 622. The second picture size data may, for example, include the picture resolution information of the second extended picture 622, that is, including a number of vertical pixels H52 and a number of horizontal pixels W62.

In this way, the display module 214 may overlap the first extended picture 612 and the second extended picture 622 for display to present picture-in-picture. Moreover, in response to the user operating the input device 240 (such as a mouse) to move from the first extended picture 612 to the second extended picture 622 so that the mouse is brought close to a picture edge B3, the controller 211 may determine whether the mouse position is located on the picture edge B3 and continues to move toward the second extended picture 622 to determine that the user is to control the second electronic device 230. Therefore, the controller 211 may notify the first electronic device 220 and the second electronic device 230 and transfer the control right of the input device 240 from the first electronic device 220 to the second electronic device 230. The mouse is moved from the first extended picture 612 to the second extended picture 622. In this way, while the mouse is located in the second extended picture 622 or the second main picture 621, the second electronic device 230 may obtain the input control data of the input device 240 from the first electronic device 220 via a wireless communication method.

In contrast, in response to the user operating the input device 240 (such as a mouse) to move from the second extended picture 622 to the first extended picture 612 so that the mouse is brought close to the picture edge B3, the controller 211 may determine whether the mouse position is located on the picture edge B3 and continues to move toward the first extended picture 612 to determine that the user is to control the first electronic device 220. Therefore, the controller 211 may notify the first electronic device 220 and the second electronic device 230 and transfer the control right of the input device 240 from the second electronic device 230 to the first electronic device 220. The mouse is moved from the second extended picture 622 to the first extended picture 612. In this way, when the mouse is located in the first extended picture 612 or the first main picture 611, the first electronic device 220 may directly use the input control data of the input device 240.

It should be mentioned that, although the second extended picture 622 is overlapped with a portion of the first extended picture 612, when the mouse is located in the second extended picture 622, the controller 211 determines that the mouse is located within the range of the second extended picture 622 instead of the first extended picture 612, and the second electronic device 230 has the control right of the input device 240.

In addition, in an embodiment, the controller 211 may also define a first predetermined range and a second predetermined range along two sides of the picture edge B3. In response to the controller 211 determining that the mouse position is within the first predetermined range or the second predetermined range (for example, the distance between the mouse and the picture edge B3 is less than the preset distance) and continues to move toward the picture edge B3, the controller 211 may notify the first electronic device 220 and the second electronic device 230 in advance to prepare to switch the control right, so that when the controller 211 determines that the mouse position touches the picture edge B3, the controller 211 may quickly switch the control right from the first electronic device 220 to the second electronic device 230, or may quickly switch the control right from the second electronic device 230 to the first electronic device 220. Therefore, the user's sense of delay when operating the mouse to move between the first extended picture 612 and the second extended picture 622 may be effectively reduced.

Figure 7:
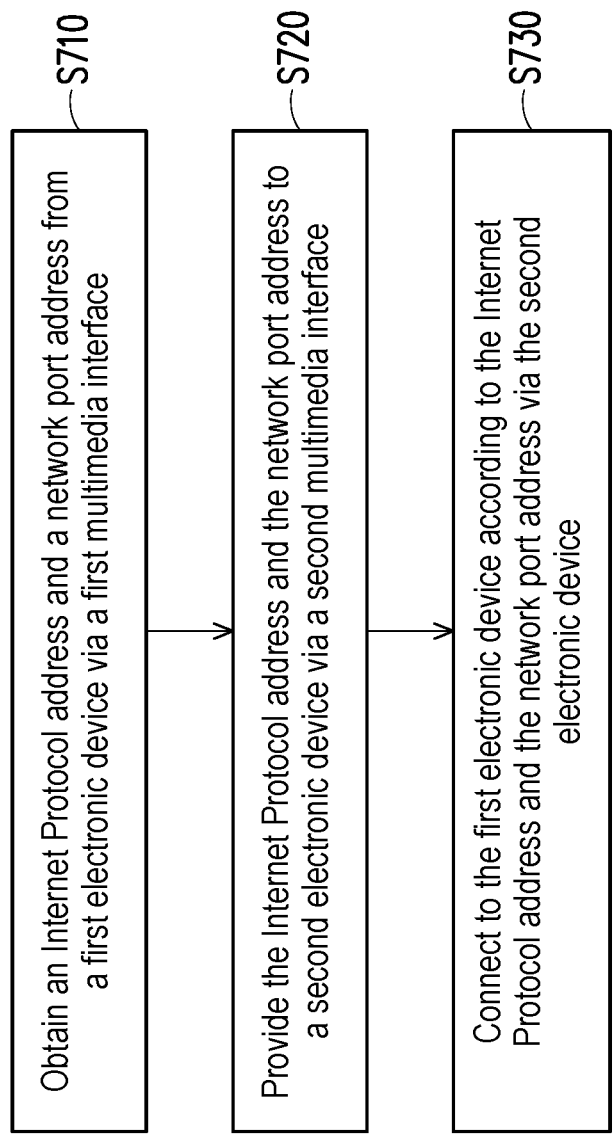
FIG. 7 is a flowchart of establishing a connection according to an embodiment of the invention.

FIG. 7 is a flowchart of establishing a connection according to an embodiment of the invention. Referring to FIG. 2 and FIG. 7, the display system 200 may perform the following steps S710 to S730 to establish a wireless communication connection between the first electronic device 220 and the second electronic device 230. In response to the first electronic device 220 being activated, in step S710, the display system 200 may obtain the Internet Protocol address (IP address) and network port address from the first electronic device 220 via the first multimedia interface 212. In an embodiment, the Internet Protocol address and the network port address may be input via a command in the Monitor Control Command Set (MCCS) protocol, for example. For example, the network port address may be transmitted using a VCP 0xFD command. Assuming that the network port address is 6000, the high byte (MH) and the low byte (SL) in the VCP 0xFD command may both be specified with the hexadecimal code "0x1770". For example, the Internet Protocol address may be transmitted using a VCP 0xFE command and a VCP 0xFF command. Assuming that the Internet Protocol address is 192.168.1.2, the high byte (MH) and the low byte (SL) in the VCP 0xFE command may be formulated with hexadecimal codes "0xC0" (192) and "0xA8" (168), and the high byte (MH) and the low byte (SL) in the VCP 0xFF command may be formulated with hexadecimal codes "0x01" (1) and "0x02" (2).

In an embodiment, the controller 211 may store the Internet Protocol address and the network port address of the first electronic device 220. In response to the second electronic device 230 being activated, in step S720, the display device 210 may provide the Internet Protocol address and the network port address to the second electronic device 230 via the second multimedia interface 213. In step S730, the second electronic device 230 may be connected to the first electronic device 220 according to the Internet Protocol address and the network port address. In other words, a wireless communication connection may be established between the first electronic device 220 and the second electronic device 230 via the display device 210.

Figure 8:
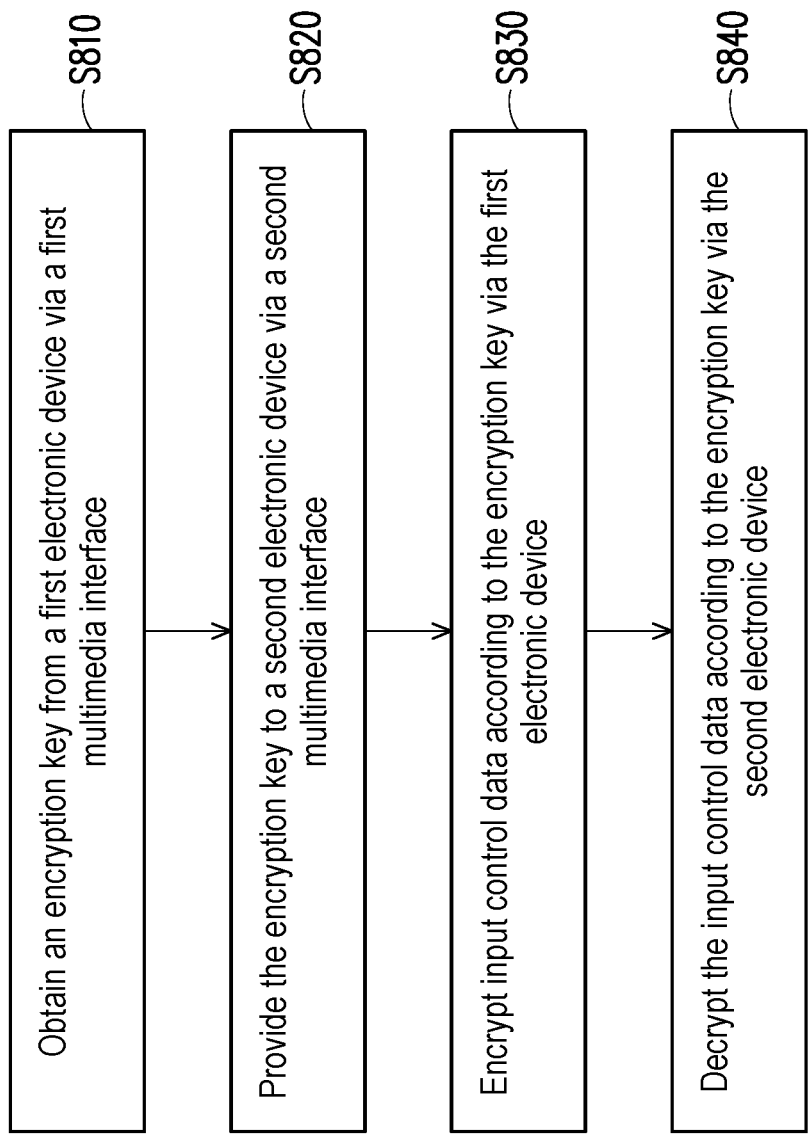
FIG. 8 is a flowchart of a data encryption method according to an embodiment of the invention.

FIG. 8 is a flowchart of a data encryption method according to an embodiment of the invention. Referring to FIG. 2 and FIG. 8, in response to the controller 211 determining the input device 240 is used to control the second electronic device 230 according to the mouse position in the display picture, input control data of the input device 240 from the first electronic device 220 is obtained via a wireless communication method by the second electronic device 230. In an embodiment, the display system 200 may perform the following steps S810 to S840 to encrypt data of data transmission between the first electronic device 220 and the second electronic device 230. In an embodiment, the connection between the first electronic device 220 and the second electronic device 230 may be established based on, for example, a Transport Layer Security (TLS) protocol or a Secure Socket Layer (SSL) protocol. In an embodiment, in response to the first electronic device 220 being activated, the first electronic device 220 may randomly generate an encryption key. In step S810, the controller 211 may obtain the encryption key from the first electronic device 220 via the first multimedia interface 212. The controller 211 may store this encryption key. In response to the second electronic device 230 attempting to connect, the second electronic device 230 may read the encryption key from the display device 210. In step S820, the controller 211 may provide the encryption key to the second electronic device 230 via the second multimedia interface 213.

In an embodiment, in response to the second electronic device 230 trying to establish a connection with the first electronic device 220, the first electronic device 220 provides the encryption key as a certificate to the second electronic device 230 via a wireless communication method. The second electronic device 230 may compare whether the encryption key of the certificate is consistent with the encryption key obtained from the display device 210 (i.e., the same encryption key). If the second electronic device 230 compares the encryption key of this certificate to be different from the encryption key obtained from the display device 210, the second electronic device 230 re-reads the encryption key from the display device 210, and after the first electronic device 220 finds that the second electronic device 230 refuses to connect (that is, the encryption key comparison fails), the first electronic device 220 determines whether the encryption key stored in the display device 210 is consistent with the encryption key provided to the second electronic device 230 via wireless communication to determine whether to resend the encryption key to the display device 210.

If the second electronic device 230 compares the encryption key of this certificate to be the same as the encryption key obtained from the display device 210, the second electronic device 230 and the first electronic device 220 may establish a connection according to the process of the embodiment of FIG. 7. In step S830, the first electronic device 220 encrypts the input control data of the input device 240 according to the encryption key. In step S840, the second electronic device 230 decrypts the input control data according to the encryption key. Therefore, data transmission (not limited to input control data) between the first electronic device 220 and the second electronic device 230 may have higher data security.

Figure 9:
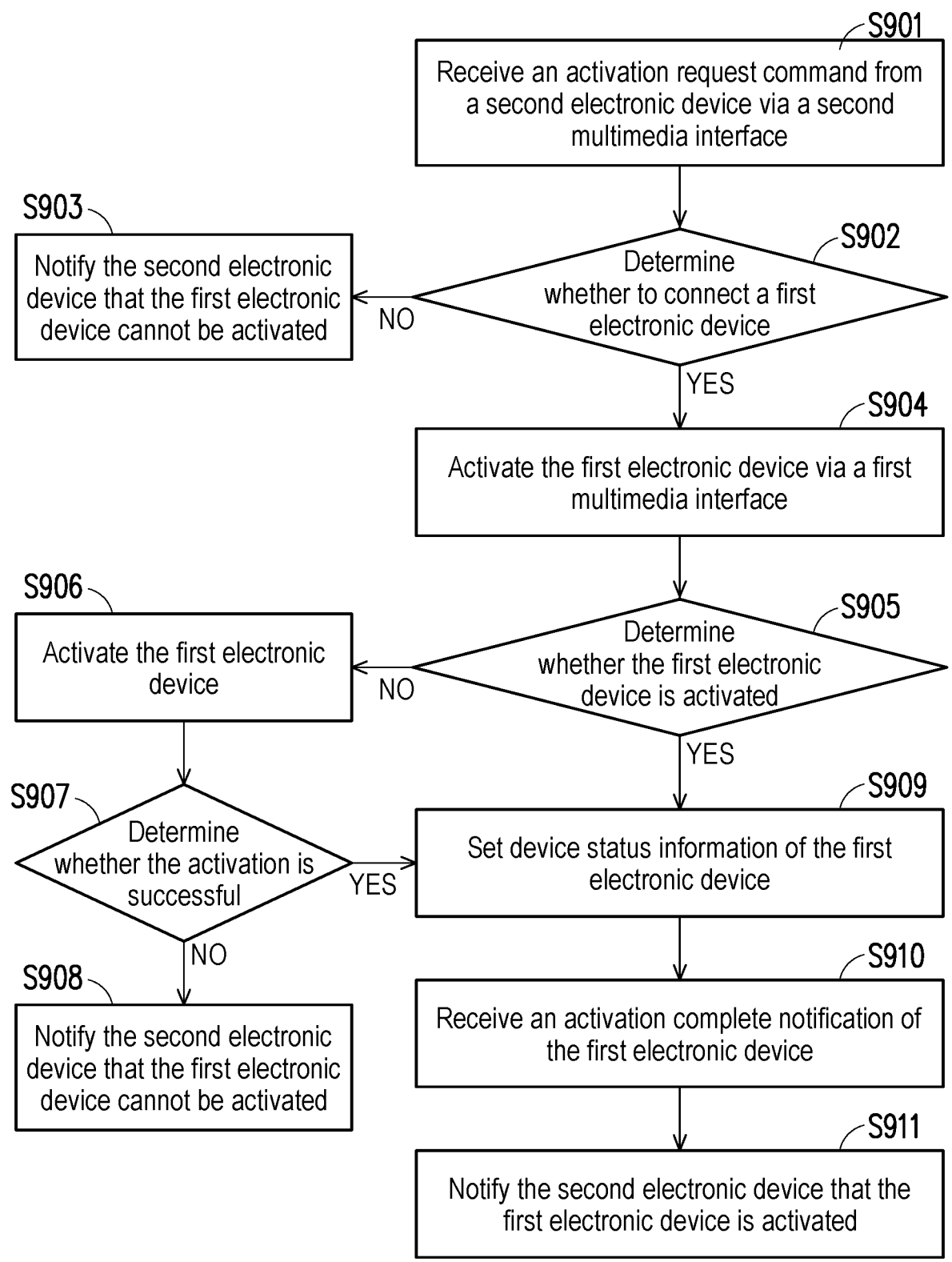
FIG. 9 is a flowchart of activating a first electronic device according to an embodiment of the invention.

FIG. 9 is a flowchart of activating a first electronic device according to an embodiment of the invention. Referring to FIG. 2 and FIG. 9, the second electronic device 230 may perform the following steps S910 to S911 to activate the first electronic device 220. In response to the user operating the second electronic device 230 and wanting to activate the first electronic device 220, the user may operate the second electronic device 230 to issue an activation request command. In step S901, the controller 211 may receive an activation request command from the second electronic device 230 via the second multimedia interface 213. The controller 211 may, for example, set the value of a VCP 0xEF command in the monitoring control command set protocol to 1, so that when the first electronic device 220 is polling, the first electronic device 220 may be notified via a VCP 0x52 command to read the value of the VCP 0xEF command (which is 1) to learn that the second electronic device 230 requires activation. In step S902, the controller 211 may determine whether the first multimedia interface 212 is connected to the first electronic device 220. If not, in step S903, the controller 211 may notify the second electronic device 230 via the second multimedia interface 213 that the first electronic device 220 may not be activated. If so, in step S904, the controller 211 may activate the first electronic device 220 via the first multimedia interface 212.

In step S905, the controller 211 may determine whether the first electronic device 220 is activated. If not, in step S906, the controller 211 may activate the first electronic device 220. If so, in step S909, the controller 211 may set the device status information of the first electronic device. In step S907, the controller 211 may determine whether the first electronic device 220 is successfully activated. If not, in step S908, the controller 211 may notify the second electronic device 230 via the second multimedia interface 213 that the first electronic device 220 may not be activated. If so, in step S909, the controller 211 may set the device status information of the first electronic device 220.

The first electronic device 220 may attempt to activate, and after successful activation, the controller 211 may, for example, set the value of the VCP 0xEF command in the MCCS protocol to 0, and set the value of the VCP 0xEE command to 1. The controller 211 may further set the value of the VCP 0xEF command to 1, and wait for polling by the second electronic device 230 via the VCP 0x52 command to notify the second electronic device 230 to read the value of the VCP 0xEE command. In response to the second electronic device 230 reading the value of the VCP 0xEE command as 1, the second electronic device 230 may learn that the first electronic device 220 is successfully activated.

In step S910, the controller 211 may receive an activation complete notification from the first electronic device 220. In step S911, the controller 211 may notify the second electronic device 230 that the first electronic device 220 is activated. Therefore, the user may activate the first electronic device 220 via the display device 210 by the second electronic device 230. Moreover, in an embodiment, the first electronic device 220 may also activate the second electronic device 230 via the display device 210 in the same manner. Therefore, the display system 200 of the invention may activate the first electronic device 220 by the second electronic device 230, or the second electronic device 230 may be activated by the first electronic device 220.

Based on the above, the display device, the display system, and the display and control method of the invention allow the first electronic device and the second electronic device to share the display device to display the respective extended pictures thereof, and the display device may be set so that the first electronic device and the second electronic device share the same input device. Moreover, in the process of switching to control the first electronic device and the second electronic device, the input device of the invention does not need to interrupt other data transmission between the first electronic device and the second electronic device, and may have a lower switching delay.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display device, comprising:
    a display module;
    a first multimedia interface externally coupled to a first electronic device via a first physical signal line;
    a second multimedia interface externally coupled to a second electronic device via a second physical signal line; and
    a controller coupled to the display module, the first multimedia interface, and the second multimedia interface,
    wherein the controller receives first picture data of a first picture of the first electronic device through the first physical signal line via the first multimedia interface and receives second picture data of a second picture of the second electronic device through the second physical signal line via the second multimedia interface,
    wherein the controller determines a content of a display picture displayed by the display module according to the first picture data and the second picture data, the controller determines whether an input device is used to control the first electronic device or the second electronic device according to a mouse position in the display picture,
    wherein the first electronic device is wirelessly communicated with the second electronic device, and
    wherein in response to the controller determining the input device is used to control the second electronic device according to the mouse position in the display picture, the second electronic device obtains input control data of the input device from the first electronic device via a wireless communication method.

2. The display device of claim 1, wherein the first picture is a first extended picture, and the second picture is a second extended picture.

3. The display device of claim 1, wherein the controller obtains an encryption key from the first electronic device via the first multimedia interface, and the controller provides the encryption key to the second electronic device via the second multimedia interface, so that the first electronic device encrypts the input control data according to the encryption key, and the second electronic device decrypts the input control data according to the encryption key.

4. The display device of claim 1, wherein the controller obtains an Internet Protocol address and a network port address from the first electronic device via the first multimedia interface, and the controller provides the Internet Protocol address and the network port address to the second electronic device via the second multimedia interface, so that the second electronic device is connected to the first electronic device according to the Internet Protocol address and the network port address.

5. The display device of claim 1, wherein in response to the controller receiving an activation request command from the second electronic device via the second multimedia interface, the controller determines that the first electronic device is not activated to activate the first electronic device, and in response to the controller determining that the first electronic device is activated, the controller notifies the second electronic device via the second multimedia interface.

6. The display device of claim 1, wherein in response to the controller operating a single picture mode, the display picture displayed by the display module is the first picture or the second picture.

7. The display device of claim 1, wherein in response to the controller operating a dual picture mode, the display picture displayed by the display module comprises the first picture and the second picture.

8. The display device of claim 1, wherein in response to the controller operating a picture-in-picture mode, the display picture displayed by the display module comprises the first picture and the second picture, and one of the first picture and the second picture is overlapped with a portion of the other one of the first picture and the second picture.

9. A display and control method, comprising:
receiving first picture data of a first picture of a first electronic device through a first physical signal line via a first multimedia interface and receiving second picture data of a second picture of a second electronic device through a second physical signal line via a second multimedia interface by a controller of a display device;
determining a content of a display picture via a display module according to the first picture data and the second picture data by the controller;
determining whether an input device is used to control the first electronic device or the second electronic device according to a mouse position in the display picture by the controller,
wherein the first electronic device is wirelessly communicated with the second electronic device; and
obtaining input control data of the input device from the first electronic device via a wireless communication method by the second electronic device in response to the controller determining the input device is used to control the second electronic device according to the mouse position in the display picture.

10. The display and control method of claim 9, wherein the first picture is a first extended picture, and the second picture is a second extended picture.

11. The display and control method of claim 9, further comprising:
obtaining an encryption key from the first electronic device via the first multimedia interface by the controller;
providing the encryption key to the second electronic device via the second multimedia interface by the controller;
encrypting the input control data according to the encryption key by the first electronic device; and
decrypting the input control data according to the encryption key by the second electronic device.

12. The display and control method of claim 9, further comprising:
obtaining an Internet Protocol address and a network port address from the first electronic device via the first multimedia interface by the controller;
providing the Internet Protocol address and the network port address to the second electronic device via the second multimedia interface by the controller; and
connecting to the first electronic device according to the Internet Protocol address and the network port address by the second electronic device.

13. The display and control method of claim 9, further comprising:

determining that the first electronic device is not activated by the controller to activate the first electronic device in response to the controller receiving an activation request command from the second electronic device via the second multimedia interface; and
notifying the second electronic device via the second multimedia interface by the controller in response to the controller determining that the first electronic device is activated.

14. The display and control method of claim 9, wherein in response to the controller operating a single picture mode, the display picture displayed by the display module is the first picture or the second picture.

15. The display and control method of claim 9, wherein in response to the controller operating a dual picture mode, the display picture displayed by the display module comprises the first picture and the second picture.

16. The display and control method of claim 9, wherein in response to the controller operating a picture-in-picture mode, the display picture displayed by the display module comprises the first picture and the second picture, and one of the first picture and the second picture is overlapped with a portion of the other one of the first picture and the second picture.

17. A display device, comprising:
a first electronic device;
a second electronic device; and
a display device externally coupled to the first electronic device via a first physical signal line, and the display device externally coupled to the second electronic device via a second physical signal line,
wherein the display device receives first picture data of a first picture of the first electronic device through the first physical signal line, and the display device receives second picture data of a second picture of the second electronic device through the second physical signal line,
wherein the display device determines a content of a display picture according to the first picture data and the second picture data and the display device determines whether an input device is used to control the first electronic device or the second electronic device according to a mouse position in the display picture,
wherein the first electronic device is wirelessly communicated with the second electronic device,
wherein in response to the controller determining the input device is used to control the second electronic device according to the mouse position in the display picture, the second electronic device obtains input control data of the input device from the first electronic device via a wireless communication method.

* * * * *